Figure 1:
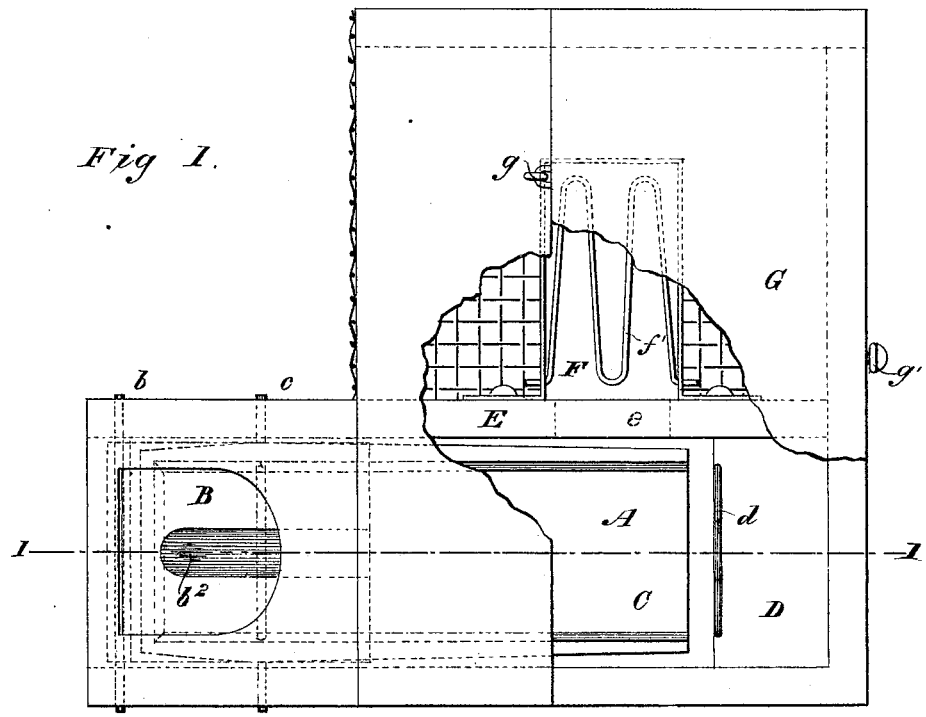

J. H. MORRIS.
ANIMAL-TRAPS.

No. 195,632. Patented Sept. 25, 1877.

WITNESSES
Wm A. Skinkle
Geo. W. Breck

INVENTOR
John H Morris.
By his Attorneys.
Baldwin, Hopkins & Peyton

2 Sheets—Sheet 2.
J. H. MORRIS.
ANIMAL-TRAPS.
No. 195,632. Patented Sept. 25, 1877.
Fig. 3.
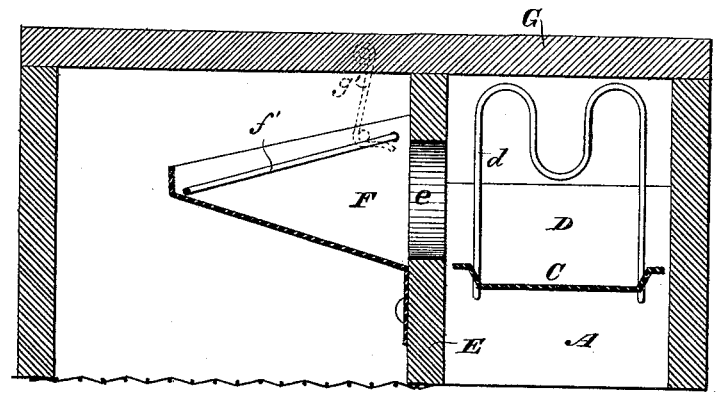
Fig. 4
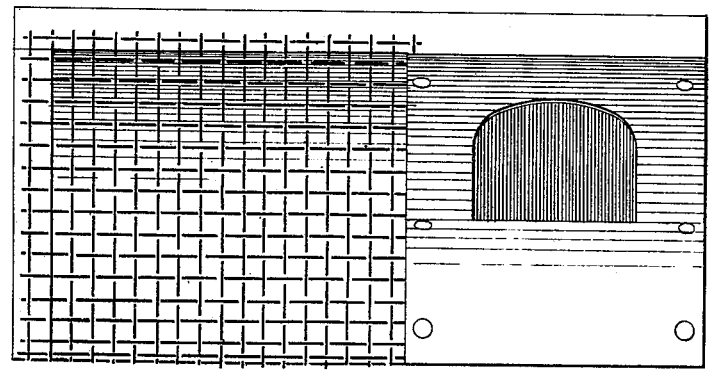
Fig. 5.
WITNESSES
INVENTOR
John H. Morris
By his Attorneys

UNITED STATES PATENT OFFICE.

JOHN H. MORRIS, OF SEWARD, NEBRASKA, ASSIGNOR TO CLAUDIUS JONES OF SAME PLACE.

IMPROVEMENT IN ANIMAL-TRAPS.

Specification forming part of Letters Patent No. 195,632, dated September 25, 1877; application filed August 4, 1877.

*To all whom it may concern:*

Be it known that I, JOHN H. MORRIS, of Seward, in the county of Seward and State of Nebraska, have invented certain new and useful Improvements in Animal-Traps, of which the following is a specification:

My invention relates to that class of animal-traps provided with hinged gates or tilting platforms, and constitutes an improvement upon the one shown in Letters Patent No. 179,940, granted to me July 18, 1876.

The object of the first part of my invention is to afford ready access both to the passage-way of the trap containing the bait and to the cage containing the trapped animals; to which ends my improvement consists in constructing the trap with a passage-way containing a receptacle for the bait and a cage for the animal, with a hinged lid or cover which affords access to both compartments.

The next part of my invention relates to the entrance to the trap. Its object is to prevent the trapped animal, with its paw, from opening the door when once closed; to which end my improvement consists in combining with said entrance a hinged flap or door, and a downwardly-projecting flange or jamb near the roof of the passage, behind which flange the inner edge of the door swings, so as to prevent access thereto when closed.

The object of the next part of my invention is to hold the tilting platform and door firmly until the weight of the entering animal is transferred from the door to the platform, then to close the door quickly, and hold it closed until relieved from the weight of the animal, when it automatically opens.

To these ends my improvement consists in combining a counterbalanced tilting platform, pivoted or hung in bearings in a passage-way, with an overlapping swinging hinged door, provided with a rib, incline, or projection, acted upon by the end of the platform to close the door quickly and hold it closed until relieved.

The object of the next part of my invention is to prevent the escape of the trapped animal from the passage-way, except into the cage, which end I attain by closing the passage-way immediately in rear of the inner end of the counterbalanced platform with a bait-receptacle or block, provided in front with a grating or open-work device, preferably of wire, whereby the animal, while entering the trap, has the bait in plain view, but after the door is closed behind, it is prevented from getting over, into, or on the bait box or shelf, and thus relieve the tilting platform of its weight, which, if permitted, would allow the door to open and the animal to spring upon it and escape.

The object of the next part of my invention is to prevent the trapped animal, after having once passed into the cage, from returning to the passage-way, which end I attain by causing the trough leading from the passage-way into the cage to slope upward, and placing it in such relation to the top of the cage as just to leave room for the passage of the animal, whereby the animal, after having once entered the cage, is prevented from opening the drop-gate with its paw.

Figure 2:
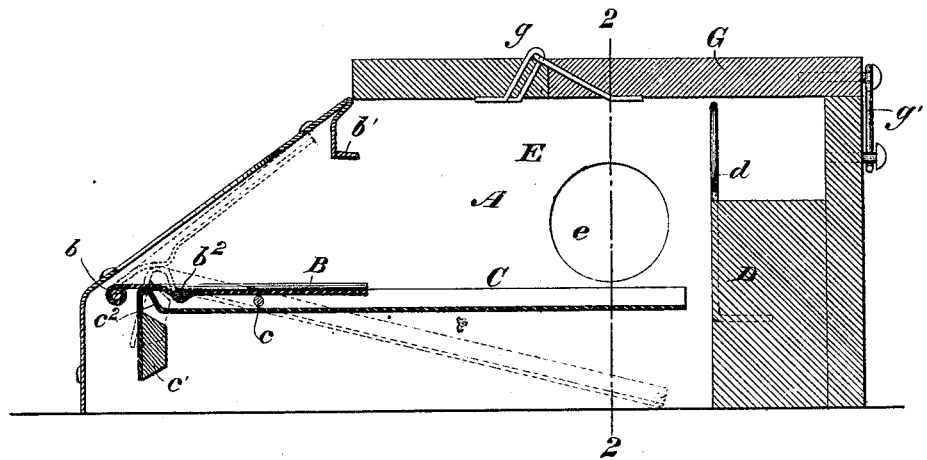

In the accompanying drawings, Figure 1 shows a plan or top view of a trap embodying all my improvements in the best way now known to me, with a portion of the cover broken away to show the internal construction of the trap. Fig. 2 represents a vertical longitudinal section therethrough on the line 1 1 of Fig. 1; Fig. 3, a vertical transverse section therethrough on the line 2 2 of Fig. 2; Fig. 4, a front elevation of the trap; and Fig. 5, a longitudinal sectional view of the tilting platform detached, and shown as provided with a friction-roller, which also serves as the counterbalancing-weight.

The trap is composed of a cage proper and an entrance, passage-way, or vestibule, A, which, by preference, projects beyond the body of the cage, and it is made with a sloping upper edge or entrance, as this construction prevents unnecessary movement of the door B, which swings vertically on a pivot, $b$. The inner or upper edge of this door, when closed or elevated, swings behind a jamb or flange, $b^1$, near the roof of the passage, so as to prevent its being opened by the paws of the trapped animal.

The door, which is provided on its under surface with an incline or projection, $b^2$, overlaps the front end of a tilting platform, C, pivoted or hung in bearings in the passage-way at $c$, the two forming the bottom of the passage, over which the animal walks in entering the trap. The tilting platform, at its front end beneath the overlapping door, is provided with a counter-balance weight, $c^1$, and with a flange or upwardly-projecting incline, $c^2$, and is so arranged in relation to the vertically-swinging door that when it is depressed at its rear end opposite the entrance, which is the case when the animal steps upon it, it acts as a lever and shuts the door, the incline $c^2$ or end of the platform acting upon the projection $b^2$ of the door. The projection on the under surface of the door is quite important, as it affords a more certain bearing for the end of the tilting platform to rest against, saves motion in the platform, and prevents the inner end of said platform from moving too far downward, the upward movement of the inner end of the platform, when the weight of the animal is removed, being limited, if desired, by a suitable stop.

Were there any place in the passage-way on which the animal could rest, and thus relieve the platform of its weight, it might spring upon the open door B and escape. I obviate this difficulty by having no resting-place in the passage-way, and by closing the passage immediately in rear of the inner end of the counterbalanced platform with a block, D, which forms a shelf or receptacle for the reception of the bait, being provided in front with a grating or open wire-work, $d$, whereby the animal, while entering the trap, has the bait in plain view, but after the door is closed behind it is prevented from getting over or on the bait box or shelf, and obtaining a resting place thereon.

The passage-way is divided from the cage proper by a partition, E, having an opening, $e$, which opens into a trough, F, in which a drop-gate, $f'$, is pivoted. This trough projects into the cage, and is sloped upward, its top or mouth being brought near the roof of the cage, so as just to leave room for the passage of the animal therefrom when escaping from the passage-way or entrance, and when once the animal has dropped into the cage to prevent it from getting upon the trough, which, if permitted, might enable it to open the drop-gate with its paw.

At least one side and bottom of the cage are, by preference, made of wire netting or gauze, or open-work of some kind, as this admits the light freely, and enables the trap to be readily cleansed, and prevents it from smelling.

The top of the trap is provided with a lid, G, turning on hinges $g$, and provided with a suitable fastening, $g'$. This lid is made to extend the entire length of the trap, and so arranged in relation to the entrance, bait-receptacle, passage-way, and cage as to afford ready access to them all when open.

When the animal enters the trap the hinged door and platform remain firm until its weight is fully transferred to the latter in its efforts to reach the bait, when the platform suddenly tilts and closes the door. This tends to frighten the animal, who naturally jumps through the opening into the trough, raises the drop-gate, and escapes into the cage, the gate immediately falling back into its normal position by its own weight.

Instead of providing the front end of the tilting platform with the counter-balance weight $c^1$ and with the flange $c^2$, as shown in Fig. 2, I intend, in some instances, especially in large traps, to employ the modification shown in Fig. 5, which consists of a tilting platform, provided with a friction-roller, $C'$, journaled in its forward end, which roller acts upon the vertically-swinging door and saves friction, whereby the action of the trap is rendered more easy and the door closed quicker than when the construction shown in Fig. 2 is employed. The roller should be heavy enough to serve the purpose of counterbalancing the platform, so as to dispense with a separate weight for that purpose.

I do not broadly claim herein, *per se*, the form of the cage, the hinged doors, the tilting platform, or the drop-gate, as these are shown in my Letters Patent above mentioned.

I claim herein as my invention—

1. In an animal-trap, the cage, the passage-way, the bait-receptacle, and the hinged lid, these members being constructed and arranged substantially as hereinbefore set forth, whereby access is afforded to all parts of the trap.

2. The combination, substantially as hereinbefore set forth, of the entrance, the hinged door, and the flange or jamb.

3. The combination, substantially as hereinbefore set forth, of the hinged door and the counterbalanced tilting platform, acting upon an incline or projection upon the under surface of the door.

4. In an animal-trap, constructed substantially as described, the hinged door, the tilting platform, and the bait box or receptacle, closing the rear end of the passage-way.

5. The communicating trough between the passage-way and cage proper, constructed as described, with an upward inclination, and so arranged in relation to the roof of the cage as just to leave room for the passage of the animal, in combination with a drop-gate pivoted in said trough.

In testimony whereof I have hereunto subscribed my name.
JOHN H. MORRIS.

Witnesses:
R. S. NORVAL,
T. E. SANDERS.